July 25, 1939.  C. W. HANSELL  2,167,480
SIGNALING
Filed Nov. 2, 1927
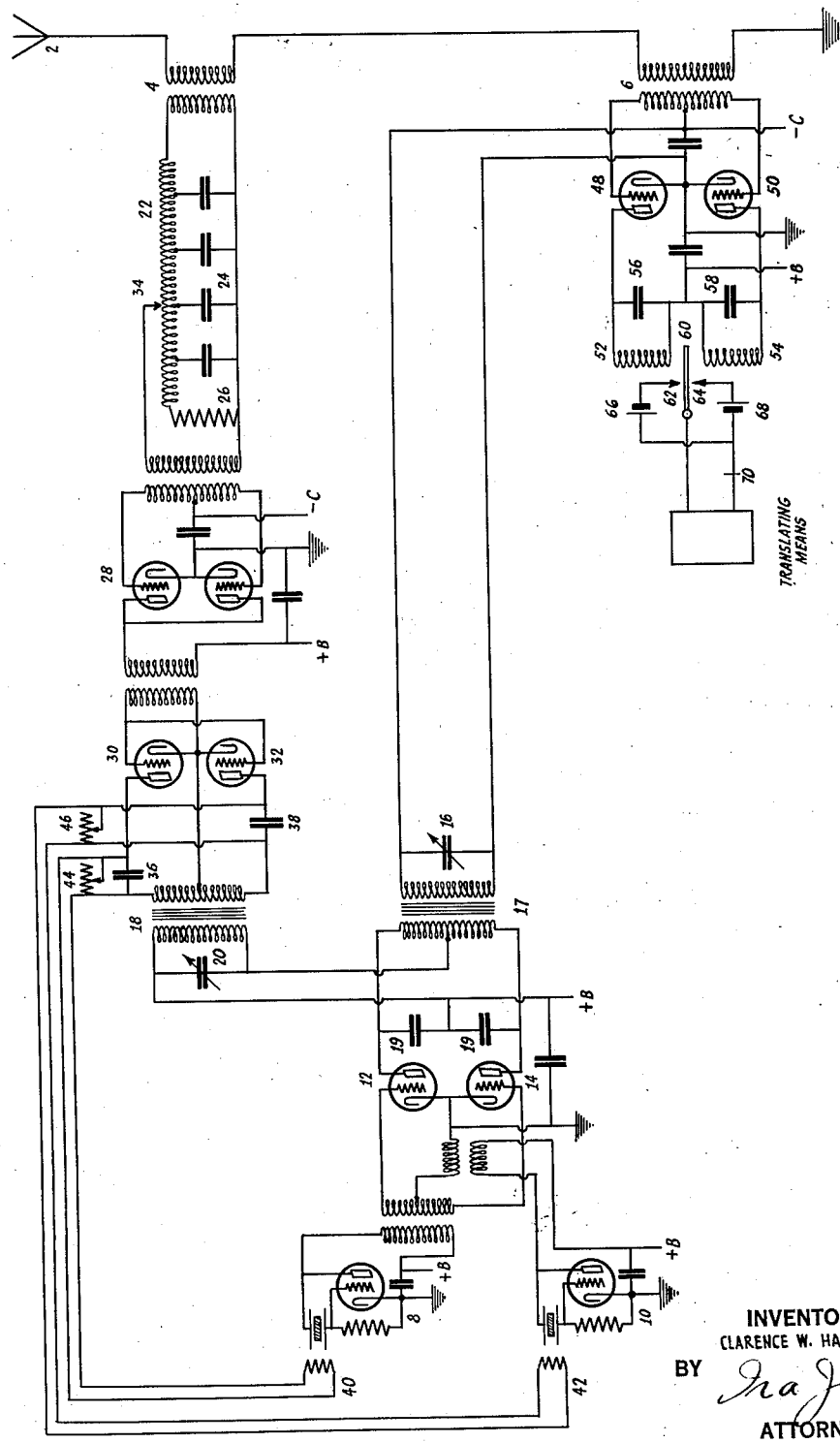
INVENTOR
CLARENCE W. HANSELL
BY *Ira J. Adams*
ATTORNEY Patented July 25, 1939

2,167,480

UNITED STATES PATENT OFFICE 2,167,480

SIGNALING

Clarence W. Hansell, Rocky Point, N. Y., assignor to Radio Corporation of America, a corporation of Delaware Application November 2, 1927, Serial No. 230,438

44 Claims. (Cl. 250—8)

This invention relates to signaling, and more particularly to a receiving system for signals transmitted by phase reversal.

Signaling by phase reversal refers to code communication wherein there are available marking periods in either of two phase relations, and spacing periods, instead of merely marking and spacing periods. These impulses may be applied to present codes by using the signals of one phase for indicating dots, signals of opposite phase for indicating dashes, and an absence of signal for indicating spacing. With this system the dashes may be shortened to the length of dots, and between successive dots and dashes no spacing is needed, the length of signal indicating the number of impulses. The speed of transmission may be greatly increased, even if the present codes, rather than special codes more particularly adapted for signaling by phase reversals, are employed. Signaling by phase reversal is especially applicable to signaling on low radio frequency carriers, such as are provided by many of the present day alternator transmitters.

A receiving system for receiving signals transmitted by phase reversal include means for detecting signal impulses transmitted by phase reversal, and accordingly it is an object of my invention to provide such a detector. For this purpose my invention comprises means to collect the received energy, a source of local energy of like frequency to the received energy, a pair of electron emission tubes, means to apply the received and local energies approximately cophaseally or in phase opposition to like electrodes of the tubes, preferably the control electrodes, one of the energies being applied in series while the other is applied in parallel, and translating means responsive to the differential of the anode currents. That tube the control electrode of which is made more positive by the energy supplied in series at the same time as both control electrodes are made more positive by the energy supplied in parallel will transfer augmented anode current. However, when the phase of the received signal is reversed the phase relations of the two energies are so relatively altered that the other of the two tubes becomes more highly conductive. The differential of the anode currents may then be employed directly in a suitable translating means, or indirectly through the medium of a differential relay which may be used to put different impulses, for example, positive and negative direct current impulses, on a line leading to a tape recorder or other suitable translating means.

The detector so far described requires that there be available at the receiver a source of energy which is in exact synchronism with the received energy, for otherwise a slight difference in frequency would soon integrate into successive phase reversals which would completely upset the distinction between signal impulses of opposite phase, or, speaking in terms of our present codes, the dots and dashes would become inverted at periodic intervals. It may be accepted that in the present state of the art it is not feasible to provide an independently controlled local oscillator which will maintain absolute synchronism, and that some frequency varying means must be employed for frequency correction. For this purpose my invention includes using crystal control to obtain approximate synchronism, and varying the characteristic frequency of the crystal by variation of the temperature, the air gap, or the tuning of the crystal in that direction, in response to a difference in phase between the received and local energies, which tends to lessen the difference.

It has already been pointed out that signaling by phase reversal is more especially applicable to signals transmitted on carriers of relatively low frequency, and for such frequencies it is difficult to obtain suitable crystals. Furthermore, it is desirable to reduce the time lag in the correction of the characteristic frequency. To overcome these difficulties is a further object of my invention, which I do by generating energy in each of two crystal controlled oscillators at higher frequencies which beat at the received frequency, and simultaneously and oppositely varying the characteristic frequencies of the crystals in that direction, in response to differences between the received and beat frequencies, which lessens the difference. In this way the time lag is reduced because of the differential action of the two changes as well as the greater frequency changes which occurs for a given percentage change in a higher frequency carrier, and at the same time the crystals may be of more ordinary dimensions.

The frequency controlling means have been described as being responsive to differences in phase or frequency between the received and local energies, and to provide such comparison and control means is a still further object of my invention. This arrangement, according to my invention, comprises a pair of electron emission tubes, means to apply one of the energies to a pair of like electrodes of the tubes, means to apply the other of the energies to a pair of like electrodes of the tubes approximately in phase quadrature one of the energies being applied in series while the other is applied in parallel, and means for varying the characteristic frequency of the crystals energized by a portion of the anode currents of the tubes. In a preferred and simple form these means are heating elements. When the phase of the energies is adjusted to quadrature the anode currents are equal, but a phase shift or frequency change of one of the energies causes the phase relation in one of the tubes to vary oppositely in sense relative to the phase variation in the other of the tubes, and therefore the anode currents become unequal. The increased current in one tube increases the heating of one of the crystals, while the simultaneous decrease in the current of the other tube decreases the temperature of the other crystal, and the circuits are so related that these temperature changes take place in that direction which lessens the difference in the anode currents.

The invention as so far described provides for adjustment of the local oscillator frequency in response to changes in the relative phase of the received and local oscillator energies, but such an arrangement disregards the difficulty caused by the fact that the signaling is to be by phase reversal, and will itself tend to cause a frequency correction which is undesired. Accordingly, it is a further object of my invention to provide for synchronizing energies independently of phase displacements of predetermined magnitude, which I do by synchronizing that harmonic of the energies which remains cophaseal despite phase displacements of the predetermined magnitude. Thus, in the case of phase reversals the second harmonics remain in phase, and therefore my invention comprises means to double the frequency of a portion of the oscillator energy, means to double the frequency of a portion of the received energy, and means responsive to a difference in the frequencies of the harmonics for varying the frequency of the local oscillator in that direction which lessens the difference.

Still another object of my invention is to provide a method and means for synchronizing a plurality of undulatory or alternating energies by synchronizing the same harmonics of the energies to be synchronized.

The invention is described more in detail in the following specification which is accompanied by a drawing the single figure of which is a wiring diagram for a preferred embodiment of my invention.

In that figure transmission energy is collected by the antennae 2 and is led to a synchronizing circuit by means of the coupling transformer 4, and to a detection circuit by means of the coupling transformer 6.

For the formation of synchronous local energy there are provided two crystal controlled oscillators 8 and 10, the outputs from which are respectively fed in push-pull and in parallel to a pair of electron emission tubes 12 and 14. The anode circuits of these are connected and contain the beat frequencies as well as the original frequencies of the oscillators 8 and 10. The difference frequency preferably is employed, and of it a portion is used for detection, being abstracted by the circuit 16, which may, but need not be tuned to that frequency, especially if the transformer 17 is iron cored. High frequency by-pass condensers 19 are desirable in such case.

As was before described, synchronism is attained by comparison of the second harmonics, and the second harmonic of the difference frequency may be obtained in the transformer coil 18, which is connected to the anode circuits of the tubes 12 and 14 in push-push. The harmonic may, if desired, be augmented by tuning the coil 18 with a condenser 20.

The synchronizing energy obtained from the transformer 4 in the antenna circuit is fed through a phase adjuster, here exemplified by an artificial transmission line comprising the inductance 22 and the condensers 24 terminated by a surge resistance 26, the latter being employed to prevent reflection. By sliding the tap 34 along the artificial line the phase change between the transformer 4 and the harmonic generator 28 may be adjusted to a desired value. The frequency doubler 28 produces the even harmonic frequency because its input is connected in push-pull while its output is connected in push-push. In this way both the positive and negative halves of the input energy are transformed, because of the full wave rectification provided by the two tubes, into a wave of double frequency.

For comparing the harmonic frequencies there are provided a pair of electron emission tubes 30 and 32, to the control electrodes of which the received energy of double frequency is coupled in parallel, and to the anodes of which the local oscillator energy of double frequency is coupled in series. The tap 34 is so positioned on the artificial line that energy is taken therefrom in proper phase relation so that the energies applied to the grids and anodes of the tubes in each of the tubes 30 and 32 are at quadrature. Consideration will show, inasmuch as the anodes are connected in phase opposition, while the grids are connected cophaseally, that the phase relation between grid and anode in one of the tubes is 90° lagging, while in the other of the tubes it is 90° leading, and that the anode currents therefore are equal, but that, upon change in the relative phase of the antenna and oscillator energies the phase relation between the grid and anode of one of the tubes may be more than 90°, while that in the other of the tubes will be correspondingly less than 90°, and the anode currents of the two tubes therefore will be unequal. The initial relation need not be exactly quadrature, and yet the scheme will work, for the bias caused by a departure from quadrature may be counteracted by other adjustments and factors. The term "quadrature" in the claims is therefore to be construed liberally as meaning in that general region.

The resulting difference in the anode currents may be used to correct the frequency of a local oscillator, so that it will follow the frequency of the received energy. The particular arrangement here shown is exceedingly simple, including merely the blocking condensers 36 and 38, which pass the alternating current components of the anode currents, but force the steady components through heating elements 40 and 42 for controlling the temperature of the crystals of the local oscillators. It is obvious that upon phase shifts the increase in the anode current of one of the tubes will raise the temperature of one of the crystals while simultaneously the decrease in the anode current of the other of the tubes will lower the temperature of the other of the crystals. Inasmuch as the effective local oscillator frequency depends upon the difference of the two much higher oscillator frequencies this arrangement helps reduce the time lag of the temperature device. To control the amount of current flow through the heaters there are provided in parallel with them the variable resistances 44 and 46.

Incidentally, the inherent lag or sluggishness in resistors 40, 42 in translating change in current to change in temperature for frequency control of the crystals, will be sufficient to take up any small and rapid changes in the apparent phase of the control and controlled waves appearing in the grid or input coil for the electron discharge device circuit comprising tubes 30, 32 and appearing in circuit 20.

As so far described there is now available locally generated energy which is exactly in synchronism with the received energy except for phase reversals of the latter. To detect these phase reversals the locally generated energy is applied to the control electrodes of a pair of tubes 48 and 50 in parallel, while the received energy is applied to the control electrodes of these tubes in series by means of the coupling transformer 6. The energies are approximately in like or in opposed phase, and if desired, though not necessarily, additional phase adjusting means may be provided for either the local or the received energy to establish such a relation. The bias of the tubes may be made such that the fluctuations on the control electrodes caused by the received energy do not make either tube conductive except when the bias of both tubes has been augmented by the locally generated energy. In such a condition only one of the tubes will be conductive, namely, that tube the control electrode of which happens to be made positive by both the received and the local energies at approximately the same time. But, upon reversal of the phase of the received energy the other of the tubes will become conductive, and this difference in the predominance of their anode currents may be used through differential relay coils 52 and 54, passed for radio frequencies by condensers 56 and 58, to affect the armature 60 of differential relay. This in turn, through contact with either or neither of the contacts 62 and 64, connected to oppositely polarized batteries 66 and 68, may be used to send over any appropriate line 70 positive and negative impulses corresponding to dots and dashes. These may be fed to a suitable tape recorder or other translating means.

It should be understood that the circuits associated with the tubes 30 and 32 for frequency comparison may be interchanged, so that the control electrodes may be connected in series and the anodes in parallel, instead of vice versa, as shown, and still further, that if desired, the received and local energies may both be connected to the control electrodes of the tubes, one being supplied in series or in parallel, while the other is supplied in parallel or in series, respectively. Less desirably, both energies may be applied to the anodes, one in series, or one in parallel. Also, the phase quadrature in the comparison circuits, instead of being obtained by phase selection from an artificial transmission line, may be obtained by employing, for example, a split phase connected goniometer, or a magnetic coupling for one of the energies, accompanied by a phase shift of approximately 90°, and a resistance coupling for the other of the energies, accompanied by zero phase displacement. It is also clear that if desired a single phase adjusting means may be provided either between the antenna and the detector or between the local oscillator and the detector, or that several such phase adjusting means may be employed, in order to obtain the proper phase relationship for optimum detection.

The grid bias on the detector tubes need not be arranged for complete cut-off in one of the tubes, for in any event there will always be obtained a differential effect in the relay coils 52 and 54. As was explained in connection with the frequency controlling circuits associated with the tubes 30 and 32, the local and received energies of fundamental frequency also may be intertransposed so that the former is connected in series while the latter is connected in parallel, and furthermore, that either or both may be connected in the anode circuits instead of in the grid circuits. Thus, the received and locally generated energies are applied to pairs of like electrodes of two tubes, one energy being applied in series and the other in parallel.

The frequency control and detection circuits are very similar, but are importantly different in operation by reason of the fact that in the former the phase relation between the energies approximates quadrature, whereas in the latter the phase relation between the energies approximates zero or 180°.

I claim:

1. The method of synchronizing alternating electrical energy locally generated at a receiver with that from a transmitter which is signaling by phase reversal which includes obtaining the second harmonic of each of these energies and synchronizing the second harmonic of the receiver with the second harmonic of the received signal.

2. The method of varying the frequency of a crystal controlled oscillator to synchronize its alternating electrical energy with comparison alternating electrical energy which includes comparing the frequencies of the energies and varying the temperature of the crystal in that direction, in response to differences in frequency between it and the comparison energy, which tends to lessen the difference.

3. In a system utilizing two adjustable oscillators, the method of obtaining alternating electrical energy in synchronism with received alternating energy which includes beating the outputs of the oscillators to beat at the received frequency, comparing the received and beat frequencies, and simultaneously and oppositely adjusting the characteristic frequency of the oscillations from the oscillators in that direction in response to the differences between the received and beat frequencies, which lessens the difference.

4. The method of receiving signals transmitted by phase reversal which includes doubling the frequency of a portion of the received energy, generating energy locally, doubling the frequency of a portion of the locally generated energy, synchronizing the received and locally generated energies by comparison of the double frequencies, and comparing the phase of the received energy of fundamental frequency with that of the local energy of fundamental frequency in order to detect phase reversal of the received energy.

5. The method of receiving signals transmitted by phase reversal which includes doubling the frequency of a portion of the received energy, generating energy locally, doubling the frequency of a portion of the locally generated energy, synchronizing the received and locally generated energies by comparison of the double frequencies, applying the remaining portions of the received and locally generated energies to pairs of like electrodes of two tubes, one energy being applied in series and the other in parallel, and utilizing the differential of the anode currents for translation.

6. An arrangement for synchronizing the local oscillator of a receiver with a transmitter which is signaling by phase reversal comprising means to double the frequency of the oscillator energy, means to double the frequency of the received energy, and means responsive to a difference in the frequencies of the harmonics for varying the frequency of the local oscillator in that direction which lessens the difference between the frequencies of the locally generated and received energies.

7. An arrangement for providing energy in synchronism with received energy comprising a crystal controlled oscillator for obtaining approximate synchronism, means to control the temperature of the crystal to control its frequency, and means responsive to a difference in frequency between the received and the oscillator energy for varying the temperature control means in that direction which lessens the difference between the frequencies of the locally generated and received energies.

8. An arrangement for providing energy in synchronism with received energy comprising two oscillators, means for combining their energies, crystals for controlling the oscillator frequencies at value which beat at the frequency of the received energy, means to control the characteristic frequencies of the crystals, and means responsive to a difference in frequency between the received and the beat frequencies for simultaneously and oppositely varying the characteristic frequencies of the crystals in that direction which lessens the difference between the frequencies of the locally generated beat energy and the received energy.

9. An arrangement for providing energy in synchronism with received energy comprising two oscillators, means for combining their energies, crystals for controlling the oscillator frequencies at value which beat at the frequency of the received energy, means to heat the crystals, and means responsive to a difference in frequency between the received and the beat frequencies for simultaneously and oppositely varying the temperatures of the crystals in that direction which lessens the difference between the frequencies of the locally generated beat energy and the received energy.

10. An arrangement for synchronizing the local oscillator of a receiver with a transmitter which is signaling by phase reversal comprising means to double the frequency of the oscillator energy, means to double the frequency of the received energy, a pair of electron emission tubes, means to apply one of the energies of double frequency to like electrodes of the tubes in series, means to apply the other of the energies of double frequency to like electrodes of the tubes in parallel, and means responsive to a difference in the anode currents of the tubes for varying the frequency of the local oscillator in that direction which lessens the difference between the frequencies of the locally generated and transmitter energies.

11. An arrangement for synchronizing the local oscillator of a receiver with a transmitter which is signaling by phase reversal comprising means to double the frequency of the oscillator energy, means to double the frequency of the received energy, a pair of electron emission tubes, means to apply one of the energies of double frequency to like electrodes of the tubes in series, means to apply the other of the energies of double frequency approximately in phase quadrature to the other like electrodes of the tubes in parallel, and means responsive to a difference in the anode currents of the tubes for varying the frequency of the local oscillator in that direction which lessens the difference between the frequencies of the locally generated and transmitter energies.

12. An arrangement for receiving signals transmitted by phase reversal comprising a local oscillator for generating energy of the same frequency as that of the received energy, means to double the frequency of a portion of the oscillator energy, means to double the frequency of a portion of the received energy, means responsive to a difference in the said harmonic frequencies for varying the frequency of the local oscillator in that direction which lessens the difference, and means to compare the phase of the remaining portions of the received and local energies of fundamental frequency in order to detect phase reversal of the received energy.

13. An arrangement for receiving signals transmitted by phase reversal comprising a local oscillator for generating energy of the same frequency as that of the received energy, means to double the frequency of a portion of the oscillator energy, means to double the frequency of a portion of the received energy, means responsive to a difference in the said harmonic frequencies for varying the frequency of the local oscillator in that direction which lessens the difference, a pair of electron emission tubes, means to apply the remainder of the received and local oscillator energies to pairs of like electrodes of the tubes, one energy being applied in series, the other energy being applied in parallel, and translating means responsive to the differential of the anode currents.

14. An arrangement for receiving signals transmitted by phase reversal comprising a local oscillator, means to double the frequency of a portion of the oscillator energy, means to double the frequency of a portion of the received energy, a pair of electron emission tubes, means to apply the said harmonic portions of the received and local energies in phase quadrature to pairs of like electrodes of the tubes, one energy in series, the other energy in parallel, means responsive to a difference in the anode currents of the tubes for varying the frequency of the oscillator in that direction which lessens the difference, another pair of electron emission tubes, means to apply the remainder of the received and local energies to pairs of like electrodes of the tubes, one energy in series, the other energy in parallel, and translating means responsive to the differential of the anode currents.

15. In a frequency control system, means to generate a wave whose frequency is to be controlled, temperature responsive means to vary the frequency of the wave generated, means to supply a control wave, means responsive to certain changes in the normal phase relation of the control and controlled wave to produce temperature variations to affect said temperature responsive means.

16. In a frequency control system involving a crystal controlled oscillator for generating the wave whose frequency is to be controlled, the method which consists in supplying a control wave, producing temperature changes determined by variations from the normal phase relation of the control and controlled waves, and applying said temperature changes to the crystal of the oscillator so as to tend to bring the oscillator back into step with the control frequency.

17. In a frequency control system involving a crystal controlled oscillator for generating the wave whose frequency is to be controlled, the method which consists in supplying a control wave, producing a current determined by variations from the normal phase relation of the control and controlled waves, translating said current into corresponding temperature changes, and applying the temperature changes to the crystal of said oscillator so as to tend to bring the oscillator back into step with the control frequency.

18. In a frequency control system, a crystal controlled oscillator at one point for generating a wave whose frequency is to be controlled, the crystal of said oscillator being responsive to temperature changes to vary the frequency of said oscillator, means to generate a control wave at another point, a circuit to transmit said wave to said first point, means at said first point responsive to certain changes in the normal phase relation of the control and controlled wave to produce temperature variations to affect said crystal.

19. In a frequency control system, means to generate a wave whose frequency is to be controlled, temperature responsive means to vary the frequency of the wave generated, means to supply a control wave, an electron discharge device circuit to which said control and controlled waves may be applied, said electron discharge device circuit producing a current varying with changes in the normal phase relation of the control and controlled waves, and means to translate said current into heat to affect said temperature responsive means.

20. In a frequency control system, means to generate a wave whose frequency is to be controlled, temperature responsive means to vary the frequency of the wave generated, means to supply a control wave, an electron discharge device circuit to which said control and controlled waves may be applied, said electron discharge device circuit producng a current varying with changes in the normal phase relation of the control and controlled waves, and a heating element controlled by said current, said heating element being associated with said temperature responsive means.

21. In a frequency control system, means to generate a wave whose frequency is to be controlled, temperature responsive means to vary the frequency of the wave generated, means to supply a control wave, an electron discharge device circuit to which said control and controlled waves may be applied, said electron discharge device circuit producing a current varying with changes in the normal phase relation of the control and controlled waves, and a heating element controlled by said current, said heating element being associated with said temperature responsive means and said heating element being sufficiently sluggish in the production of temperature changes so as to be relatively unresponsive to minor variations in the phase relation of the control and controlled wave.

22. In a frequency control system, a crystal controlled oscillator at one point for generating a wave whose frequency is to be controlled, the crystal of said oscillator being responsive to temperature changes to vary the frequency of said oscillator, means to generate a control wave at another point, a circuit to transmit said wave to said first point, an electron discharge device circuit to which said control and controlled waves may be applied, said electron discharge device arrangement producing a current varying with changes in the normal phase relation of the control and controlled waves, and means to translate said current into heat to affect said crystal.

23. In a frequency control system, a crystal controlled oscillator at one point for generating a wave whose frequency is to be controlled, the crystal of said oscillator being responsive to temperature changes to vary the frequency of said oscillator, means to generate a control wave at another point, a circuit to transmit said wave to said first point, an electron discharge device circuit to which said control and controlled waves may be applied, said electron discharge device circuit producing a current varying with changes in the normal phase relation of the control and controlled waves, and a heating element controlled by said current, said heating element being associated with said crystal.

24. In a frequency control system, a crystal controlled oscillator at one point for generating a wave whose frequency is to be controlled, the crystal of said oscillator being responsive to temperature changes to vary the frequency of said oscillator, means to generate a control wave at another point, a circuit to transmit said wave to said first point, an electron discharge device circuit to which said control and controlled waves may be applied, said electron discharge device circuit producing a current varying with changes in the normal phase relation of the control and controlled waves, and a heating element controlled by said current, said heating element being associated with said crystal and said heating element being sufficiently sluggish in the production of temperature changes so as to be relatively unresponsive to minor variations in the phase relations of the control and controlled wave.

25. The method of regulating the frequency of an oscillator which is subject to temperature variations and whose frequency varies with temperature variations which comprises comparing the frequency of oscillations derived therefrom with a definite fixed frequency obtained from another source and regulating the temperature of said oscillator in accordance with frequency variations of said oscillations from a fixed relationship to said fixed frequency, whereby the frequency of said oscillator is varied.

26. The method of maintaining substantially constant the frequency of a piezo-electric oscillator whose frequency is a function of temperature, which comprises producing a wave whose frequency is controlled by the frequency of said piezo-electric oscillator and controlling the temperature of said oscillator in accordance with variations in the frequency of said wave, whereby the frequency of said oscillator is varied.

27. The method of regulating the frequency of a piezo-electric oscillator which varies with temperature variations, by control of its temperature, which comprises producing a wave whose frequency is controlled by the frequency of said piezo-electric oscillator, and regulating the temperature of said oscillator in accordance with frequency variations of said wave, whereby the frequency thereof is varied.

28. In a substantially constant frequency system, a plurality of sources of oscillations, said sources varying in frequency with variations in temperature to which they are subjected, means to combine the oscillations of said sources to produce a resultant wave dependent upon the frequencies of said two oscillations, and means responsive to said wave for controlling the temperature to which said sources are subject, whereby the frequencies thereof are controlled.

29. In combination, an oscillator the frequency of which is dependent upon temperature, a second oscillator the frequency of which is also dependent upon temperature, means for impressing oscillations from both said oscillators upon a common circuit to produce currents the frequency of which is dependent upon the frequencies of both of said oscillations, and means under the control of oscillations resulting from the combining operation for regulating the temperatures to which said oscillators are subjected.

30. In combination, an oscillator the frequency of which is controlled by a piezo-electric crystal, the natural frequency of which changes with change in temperature, a second oscillator the frequency of which is controlled by a piezo-electric crystal, the natural frequency of which varies with variations in temperature, a circuit connected to said oscillators to receive oscillations therefrom and tuned to a frequency different from said oscillator frequencies, heating means for both said crystals, and means under the control of said different frequency currents for controlling said heating means.

31. The method of regulating the frequencies of two piezo-electric controlled oscillators which are subjected to temperature conditions and whose frequencies vary with changes in said conditions, which comprises producing heat frequency oscillations by interaction of the output oscillations of said oscillators and by control of said temperature conditions by said beat frequency oscillations, maintaining the beat frequency a desired value.

32. The method of controlling the frequency of a piezo-electric oscillator whose frequency is a function of temperature, which comprises producing a wave whose frequency is controlled by the frequency of said piezo-electric oscillator, and controlling the temperature of said oscillator in accordance with variations in the frequency of said wave, whereby the frequency of said oscillator is varied.

33. The method of producing a substantially constant frequency by controlling the temperature of a plurality of piezo-electric crystals which comprises producing a plurality of waves of the natural frequencies of said crystals, producing a frequency component of said waves, and controlling the temperature of said crystals by said frequency wave component.

34. In combination, a piezo-electric oscillator, a second piezo-electric oscillator, means for heating said piezo-electric oscillators, means for producing a third frequency between the frequencies of said piezo-electric oscillators, and means for varying the heating and hence temperature of said piezo-electric oscillators, in response to variations in frequency of said third frequency.

35. Means for producing a controlled frequency comprising an oscillator whose frequency is controlled by a piezo-electric crystal, a second oscillator whose frequency is controlled by a piezo-electric crystal, means for producing a wave whose frequency differs from said oscillator frequencies, and means responsive to variations in said differing frequency for regulating the temperature of said crystal so as to correct for variations in the frequency of one of said oscillators.

36. Means for producing a constant frequency comprising two oscillators, a piezo-electric crystal for controlling the frequency of each of said oscillators, means for heating said piezo-electric crystals, means for producing a wave whose frequency is different from the frequencies of said oscillators, and means for changing the heating and hence temperature of said crystals in response to changes of said different frequency.

37. A crystal oscillator, a second crystal oscillator, means for combining oscillations of said oscillators to produce oscillations of a third frequency, and means under the control of said third frequency oscillations to control the temperature conditions to which said two oscillators are subjected.

38. In a system of frequency control, a source of control waves, an oscillation generator for generating waves bearing a predetermined relation in frequency to said control waves, said oscillation generator having a frequency varying element responsive to temperature variations, means for varying the temperature of said element, means for combining said control waves and waves from said oscillation generator, and means for varying said temperature varying means in response to said combined waves whereby said oscillation generator is caused to operate at said desired predetermined relation in frequency.

39. In a system for maintaining an oscillation generator in synchronism with control waves, the combination of an oscillation generator having frequency controlling means responsive to variations in temperature for varying the frequency of oscillation of said generator, means for varying the temperature of said temperature responsive frequency controlling means, a source of control waves, means for combining energies from said source of control waves and from said oscillation generator, and means for varying said heating means in response to said combined energies whereby said oscillation generator is maintained in synchronism with said source of control waves.

40. In combination, a piezo electric oscillator, a heater for the piezo electric element of said oscillator, and means controlled by energy derived from said oscillator for controlling said heater.

41. A receiving system adapted to receive a signal consisting of an oscillation whose frequency is constant and whose phase assumes alternately two values in opposition, comprising a local generator supplying a continuous oscillation having the same frequency as the signal oscillation, means for obtaining from the said signal oscillation a first auxiliary oscillation whose phase is constant and whose frequency is a multiple of that of the signal oscillation, means for obtaining from the continuous oscillation supplied by the local generator a second auxiliary oscillation having the same frequency as the first-mentioned auxiliary oscillation, means for effecting the interference of the two auxiliary oscillations for producing a resulting interference current, means for controlling the frequency of the said local generator by the said interference current, and means for simultaneously impressing the signal oscillation and the continuous oscillation supplied by the local generator on the detector of the receiving system.

42. A receiving system adapted to receive a signal consisting of an oscillation whose frequency is constant and whose phase assumes in turn two values in opposition, comprising a generator supplying a local oscillation having the same frequency as the signal, a first auxiliary circuit whose input end receives the signal oscillation and whose end supplies an auxiliary oscillation whose frequency is a multiple of the signal frequency, a second auxiliary circuit adapted to select the harmonic of the local oscillation having the same frequency as the auxiliary oscillation, a rectifier in which the auxiliary oscillation obtained from the signal and the harmonic obtained from the local oscillation are caused to interfere, a connection by which the current produced by this interference controls the frequency of the generator, and means for simultaneously impressing the signal and the local oscillation supplied by the generator on the detector of the receiving system.

43. A receiving system adapted to receive a signal without carrier oscillation, comprising, a local generator supplying a continuous oscillation having the same frequency as the signal, means for obtaining from the oscillation constituting the signal a first auxiliary oscillation whose phase is constant and whose frequency is a multiple of that of the signal, means for obtaining from the continuous oscillation supplied by the local generator a second auxiliary oscillation having the same frequency as the first-mentioned auxiliary oscillation, means causing the interference of the two auxiliary oscillations, means for controlling the frequency of the said local generator by the current produced by the said interference, and means for simultaneously impressing the signal and the continuous oscillation supplied by the local generator on the detector of the receiving system.

44. A receiving system adapted to receive a telegraphic signal in which the dots and dashes on the one hand, and the spaces between the dots and dashes on the other hand, consist respectively of two oscillations having the same frequency and in phase opposition, comprising, a local generator supplying a continuous oscillation having the same frequency as the signal, means for obtaining from the oscillation constituting the said signal a first auxiliary oscillation whose phase is constant and whose frequency is a multiple of that of the signal, means for obtaining from the continuous oscillation supplied by the local generator a second auxiliary oscillation having the same frequency as the first-mentioned auxiliary oscillation, means causing the interference of the two auxiliary oscillations, means for controlling the frequency of the said local generator by the current produced by the said interference, and means for simultaneously impressing the signal and the continuous oscillation supplied by the local generator on the detector of the receiving system.

CLARENCE W. HANSELL.